INVENTOR.
ROBERT R. ERNST

United States Patent Office 3,687,612
Patented Aug. 29, 1972

3,687,612
METHOD OF CONTROLLING RELATIVE HUMIDITY IN GASEOUS STERILIZERS
Robert R. Ernst, Rochester, N.Y., assignor to
Sybron Corporation, Rochester, N.Y.
Filed Oct. 12, 1970, Ser. No. 79,960
Int. Cl. A61l 1/00, 13/00
U.S. Cl. 21—58                                        4 Claims

ABSTRACT OF THE DISCLOSURE

A method and apparatus for controlling relative humidity in a gas sterilizer. The sterilizer includes a closed evaporator and condenser system wherein the evaporator is located inside and the condenser is located outside the sterilizing chamber. The closed system contains a fluid having a boiling point substantially equal to that saturation temperature or dew point within the sterilizer, which corresponds to the desired relative humidity at the operating temperature of the sterilizer. Since the saturation temperature is below the operating temperature of the sterilizer, the fluid will be constantly boiling which maintains the evaporator at the dew point temperature so that the moisture in excess of the amount necessary to provide the desired relative humidity will condense on the surface of the evaporator. Condensation and reevaporation of this excess maintains the relative humidity within the sterilizer substantially constant.

BACKGROUND OF THE INVENTION

The present invention relates to a method and apparatus for controlling relative humidity in environmental chambers, and particularly, gas sterilizing vessels.

Various methods and apparatus are generally known for sensing and controlling relative humidity. Relative humidity sensors vary from the relatively crude hair hygrometers to relatively sophisticated electronic control devices which may employ either a chemical-electrical resistance or conductivity sensor or dew point measuring optical readout devices. These optical devices, for example, employ a polished metal surface or Dew Pointer which is maintained at a substantially constant temperature. A photocell is deployed to monitor the reflectivity of the polished surface so that any moisture condensing on the surface of the Dew Pointer is detected by the photocell due to the corresponding reduction in reflectivity of the polished surface.

All of these relative humidity sensors have various drawbacks, for example, the optical devices may become dirty resulting in poor operation or failure to measure the reflectivity of the polish surface. The crude hair hygrometers and the sophisticated electronically controlled devices are all subject to errors when used in the presence of atmospheres which contain chemical vapors other than air which may damage the sensors. Also, such devices are difficult to use at temperatures above ambient due to the damage the higher temperature may inflict on the sensor and the difficulty of obtaining accurate readings when the sensor is insulated.

In addition to a sensing device, apparatus for controlling the relative humidity must also include a readout device to interpret the information gathered by a sensor and some sort of controller which acts responsive to the output of the readout device to add or remove moisture from the environment when the sensor detects any deviation from the preset level. This requires relatively costly valves, valve actuators and the like which all add to the cost of the relative humidity controller while reducing reliability.

The influence of temperature and chemical vapors other than air on the sensor and the problems of controlling relative humidity have particular pertinence to gas sterilizers. Sterilizing apparatus which employ a gaseous sterilizing medium such as ethylene oxide are often operated at temperatures ranging from ambient to above 100° F. In addition, it is well known in the art that where ethylene oxide is used, a controlled moisture or humid condition will greatly increase the biocidal effectiveness of the sterilizing gas. While the concentration of the gas and the temperature also have a bearing on the biocidal effectiveness of a sterilizing gas such as ethylene oxide, it is generally desired to maintain a relative humidity level within the sterilizer of approximately 30–60% when such a gaseous sterilizing medium is used. Once the specific relative humidity level within this range which provides the most effective moisture condition for the particular gas concentration and sterilizing temperature is determined, it is desired to maintain the relative humidity throughout the sterilizing processes relatively close to this predetermined level. Means for determining the most appropriate humidity level for the particular sterilizing gas, time and temperature conditions is known in the art. Accordingly, the present invention provides a relative humidity sensor and controller which is reliable only for a specific set of relative humidity and temperature conditions and which is inexpensive to manufacture, simple to operate and relatively maintenance free.

SUMMARY OF THE INVENTION

The method and apparatus of the present invention may be characterized in one aspect thereof by the provision of a closed environmental chamber such as a sterilizer or the like which is heated to a predetermined temperature into which is introduced an amount of moisture in excess of the amount necessary to provide the desired relative humidity. Within the chamber is a Dew Pointer, the Dew Pointer being the evaporator portion of a closed evaporator-condenser system with the condenser portion being located outside of the chamber. The system contains a fluid having a boiling point below the predetermined temperature of the sterilizer and substantially equal to that dew point corresponding to the desired relative humidity within the chamber wherein the fluid is maintained in a state of constant boiling to keep the evaporator or Dew Pointer at this dew point temperature. Any excess moisture within the chamber condenses on and drops from the evaporator to be revaporized within the chamber thereby maintaining steady state condition at substantially the desired relative humidity.

OBJECTS OF THE INVENTION

One object of the present invention is to provide a method and apparatus for controlling relative humidity which is reliable for a given set of temperature and relative humidity conditions.

Another object of the present invention is to provide a method and apparatus for maintaining the relative humidity within a closed environmental chamber at a substantially constant predetermined level wherein the amount of moisture within the environmental chamber is in excess of the amount necessary to provide the predetermined relative humidity.

A further object of the present invention is to provide a method and apparatus for controlling relative humidity within a closed environmental chamber wherein a constantly boiling liquid is used to maintain a Dew Pointer within the chamber at a substantially constant temperature below the temperature of the chamber.

Yet another object of the present invention is to provide a method and apparatus for controlling relative humidity which is particularly applicable in environmental chambers where the desired conditions of temperature and relative humidity are kept constant, the apparatus of the present invention being simple in design, inexpensively manufactured and easily operated.

These and other objects, advantages and characterizing features of the present invention will become more apparent upon consideration of the following detailed description thereof when taken in connection with the accompanying drawing depicting the same.

DESCRIPTION OF THE PREFERRED EMBODIMENTS

Figure 1:
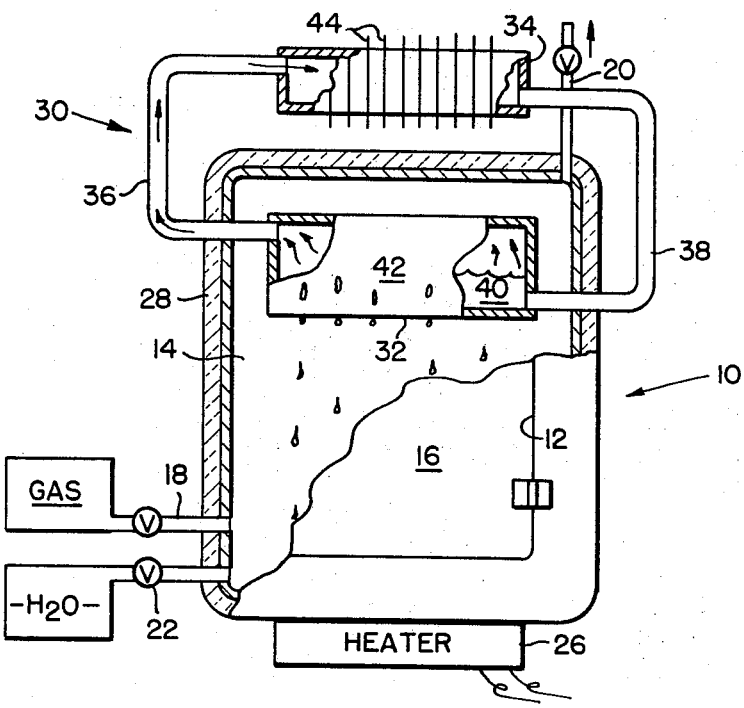
FIG. 1 is a schematic representation partly broken away and in section of an environmental vessel employing the relative humidity controller of the present invention.
Figure 2:
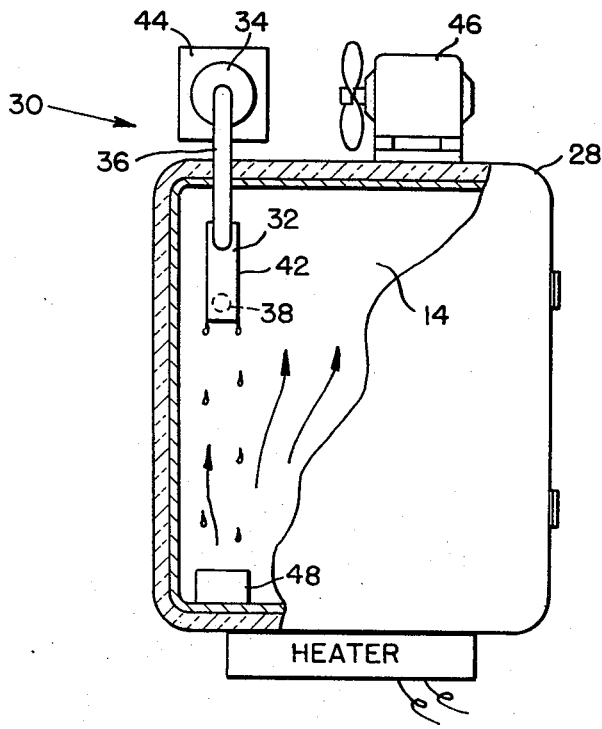
FIG. 2 is a side elevation view of the apparatus shown in FIG. 1.

Referring to the drawing, FIGS. 1 and 2 show a schematic representation of an environmental chamber 10 in which the present method and apparatus for controlling relative humidity may be used. While the present invention may be used with any closed chamber wherein there is a need to maintain the relative humidity at a substantially constant level such as an incubator, gas sterilizer or the like, the present invention will be described in particular, as if the closed vessel were a gas sterilizer. Accordingly, gas sterilizing vessel 10 includes an opening 12 into the sterilizing chamber 14 for loading or unloading the goods to be sterilized, and a closure 16 for the opening. In addition, sterilizing vessel 10 has a gas inlet 18 connected to a source of sterilizing gas such as ethylene oxide or the like and a valved vent 20 to permit the removal of air as the vessel is being charged with the sterilizing gas.

The sterilizing vessel also has a rate controlling orifice 22 connected to a water source for introducing moisture into the sterilizing chamber. Methods for evacuating air from the chamber and introducing the sterilizing gas and water into the chamber, the influence of moisture on the effectiveness of the sterilizing gas such as ethylene oxide and the importance of controlling the amount of moisture or relative humidity within the sterilizing chamber are all well known in the art as, for example, United States Patent No. 3,068,064. It should be sufficient for purposes of the present invention merely to state that relative humidity does have an effect on the biocidal effectiveness of the sterilizing gas such as ethylene oxide and that the relative humidity must be maintained at a substantially constant level depending upon the gas concentration and the sterilizing temperature. In the case of other types of environmental vessels such as incubators, the relative humidity must be kept at a substantially constant level depending upon the requirements of what is being incubated and upon the other environmental conditions, such as temperature, which exists within the environmental chamber.

The vessel 10 also includes a suitable thermostat and heater means 26 for maintaining chamber 14 at a substantially constant temperature. In this respect, the vessel may be provided with a layer of insulating material 28 to facilitate the control of temperature.

The relative humidity sensor and controller of the present invention is generally indicated at 30. The relative humidity controller 30 consists essentially of two interconnected portions, an evaporator portion or Dew Pointer 32 arranged within chamber 14 and a condenser portion 34 located outside of the chamber with lines 36 and 38 providing communication between the evaporator and condenser. The evaporator 32, condenser 34 and lines 36 and 38 provide a closed loop system which contains a fluid 40 having properties more specifically set out hereinbelow.

Evaporator or Dew Pointer 32 is preferably constructed of a metal having good thermal conductivity such as copper with the surface 42 of the evaporator being highly polished. The condenser portion 34 may be provided with a plurality of fins 44 with a fan 46 (FIG. 2) arranged to blow air across the condenser portion for facilitating the cooling of the condenser.

The particular fluid 40 selected for use in the closed evaporator-condenser system must have a boiling point substantially equal to that saturation temperature or dew point of the moisture within chamber 14 corresponding to the desired relative humidity. This will provide fluid 40 with a boiling point below the operating temperature within chamber 14. A fluid having these properties will be kept constantly boiling when the environmental chamber is in use for purposes of maintaining evaporator 32 at the temperature corresponding to the appropriate dew point within chamber 14. With evaporator 32 maintained at this temperature, excess moisture within the sterilizing chamber will condense on surface 42 and drip from the evaporator. This excess condensed moisture which may be received either in a container 48 (FIG. 2) or directly on the floor of the heated chamber will slowly vaporize wherein the condensation and re-evaporation process provides a steady state environment in chamber 14 at substantially the desired relative humidity.

Thus, all that is required for implementing the present invention once the operating temperature and optimum relative humidity has been established, is first to determine the saturation temperature or dew point corresponding to this relative humidity and then select an appropriate fluid for use in relative humidity sensor-controller 30 which has a boiling point corresponding to this saturation temperature. The following table for example is indicative of the saturation temperature corresponding to relative humidities of 30 and 60% at various operating temperatures.

TABLE I

| Sterilizer or environmental control chamber operating temperature | Dew Point Controller Temperatures (° F.) for— | |
|---|---|---|
| | 30% RH | 60% RH |
| Ambient or 80° F. | 44 | 64 |
| 100° F. | 61 | 84 |
| 110° F. | 70 | 92 |
| 120° F. | 77 | 102 |
| 130° F. | 86 | 111 |
| 140° F. | 95 | 120 |

From the above table, it should be readily apparent that at an operating temperature of 130° F. with a desired relative humidity of 30%, the appropriate fluid used as the constantly boiling liquid in relative humidity sensor-controller 30 should have a boiling point of approximately 86° F. in order to provide the desired 30% relative humidity.

In operation then, the goods to be sterilized are loaded into the sterilizing chamber 14 of vessel 10 through opening 12 and the opening sealed by closure 16. The vessel is heated to the desired temperature and moisture introduced into the vessel through rate controlling orifice 22. While the amount of moisture introduced into the vessel should be in excess of the amount necessary to provide the desired relative humidity, the total amount of moisture admitted to chamber 14 depends in part upon the moisture absorbing capacity of the load being sterilized. The appropriate amount of the sterilizing gas such as ethylene oxide is then introduced through gas inlet 18.

Since the boiling point of fluid 40 is below the temperature within sterilizing chamber 14, this liquid will begin to boil before the sterilizer has reached its operating temperature. The temperature of fluid 40 will not raise above the boiling point since any additional heat absorbed as latent heat will vaporize more of the fluid. As the slight pressure is built up in evaporator 32, the vapors generated will pass through line 36 to condenser 34. The cooling action of fan 46 blowing ambient air over fin 44 will cool the condenser to condense the vapors back to a liquid, the liquid then flowing by gravity through line 38 back to the evaporator 32.

With fluid 40 within the evaporator kept in a state of constant boiling, surface 42 of the evaporator or Dew Pointer will be maintained at a substantially constant temperature corresponding to the dew point or saturation temperature within the sterilizing chamber, this temperature being below the temperature in chamber 14. Further, since chamber 14 contains an amount of moisture in excess of the amount necessary to provide the desired relative humidity at the operating temperature of the chamber, the excess moisture will tend to condense on surface 42 which is being maintained at a temperature below the chamber temperature. Moisture condensing on surface 42 will drip and fall by gravity to the bottom of the chamber. There, the condensed liquid, which may be accumulated either in container 48 or directly on the bottom of the chamber, will be reevaporated. This continuous condensation and reevaporation process will provide a steady state relative-humidity condition at substantially the desired value.

As a specific example of the invention, a sterilizer employing ethylene oxide as the sterilizing medium, was heated to 130° F. At this temperature and at the concentration of ethylene oxide which was used, a relative humidity level of 40–60% was required to produce a maximum biocidal effectiveness. According to Table I, the appropriate fluid for use in the present invention which would provide the desired relative humidity at an operating temperature of 130° F. should have a boiling point between 86° F. and 111° F. More specifically, methylene chloride which has a boiling point of 104° F. was selected for use as the constant boiling fluid since the dew point or saturation temperature corresponding to 50% relative humidity at 130° F. is approximately 104° F.

The sterilizing chamber after loading was heated to approximately 130° F. and the chamber charged with an amount of moisture in excess of the amount necessary to provide a relative humidity of 50%. Considering the moisture absorbing capacity of the load being sterilized, an excess of total moisture of about 12 times the saturation level was introduced into the chamber with the moisture input rate set by rate controlling orifice 22 being sufficient to exceed saturation levels in the uncontrolled chamber by a factor of 2 per minute.

As moisture is introduced into the chamber, it tends to stratify upwards since the vapor density of water vapor is about one-half the density of air in the chamber. For this reason, it was found that the evaporator portion 32 is best located in the upper half of the chamber.

After approximately ten minutes, the sterilizing gas, a mixture of ethylene oxide and Freon-12 was introduced into the bottom of the chamber with the lighter air and free moisture being displaced and vented from the top of the chamber. The sterilizing gas was continuously introduced for approximately eight minutes and during this period, moisture was admitted to replace the moisture displaced through vent 20 by the sterilizing gas. The introduction of moisture was allowed to continue even after the end of the gas introduction cycle for about four more minutes.

The following Table II shows the various relative humidity levels at both the top and bottom of sterilizing chamber 14 over the major portion of the sterilizing cycle. Since the evaporator portion 32 or Dew Pointer is located closer to the top of the chamber, the relative humidity adjacent the top of the chamber is maintained within closer limits with the controlling influence of the Dew Pointer decreasing as the distance from the Dew Pointer increases. A slight variance in the relative humidity at the top and bottom of the chamber is also caused by the slight difference in temperature at these two points. Table II also indicates that the surface temperature of the Dew Pointer is slightly higher than the theoretical 104° F. boiling temperature of methylene chloride. This may be attributed to the thermal lag associated with the metal of which the Dew Pointer is constructed.

TABLE II

| Time | Relative humidity (percent) | | Temperature (° F.) | | |
|---|---|---|---|---|---|
| | Top | Bottom | Chamber | Dew Pointer | Top |
| 7 min | 46 | 56 | 135 | 108 | 144 |
| 8 min | 46 | 60 | | | |
| 9 min | 46 | 62 | 136 | 109 | |
| Start steriliant introduction air displacement | | | | | |
| 10 min | 54 | 63 | | | |
| 11 min | 50 | 58 | 134 | 107 | 142 |
| 12 min | 50 | 50 | 134 | 106 | 140 |
| 13 min | 48 | 42 | 134 | 105 | 140 |
| 14 min | 44 | 41 | 134 | 105 | 139 |
| 15 min | 42 | 34 | 132 | 106 | 137 |
| 16 min | 39 | 45 | 133 | 110 | 136 |
| 17 min | 39 | 53 | 133 | 106 | 136 |
| Stop sterilant introduction | | | | | |
| 17.5 min | 39 | 53 | 133 | 106 | 135 |
| 19 min | 41 | 53 | 132 | 106 | 134 |
| 21 min | 41 | 53 | 132 | 106 | 132 |
| 24 min | 42 | 54 | 136 | 106 | 130 |
| 27 min | 44 | 55 | 126 | 106 | 128 |
| 30 min | 45 | 58 | 125 | 106 | 125 |
| 33 min | 45 | 58 | 130 | 106 | 130 |
| 36 min | 41 | 55 | 135 | 106 | 136 |
| 38 min | 39 | 54 | 136 | 106 | 137 |
| 39 min | 39 | 53 | 135 | 105 | 136 |
| 40 min | 39 | 53 | 135 | 105 | |
| 43 min | 39 | 53 | 133 | 105 | 136 |
| 47.25 end | | | | | |

Total cycle time=55.0 min.

In Table III is shown the average relative humidity levels over a test of nine sterilizing cycles in the same sterilizing apparatus as used in the foregoing example. In each of the nine cycles, the chamber temperature was maintained at approximately 130° F. and the temperature of the evaporator surface was approximately 106° F.

TABLE III

| Cycle | Chamber relative humidity (percent) | |
|---|---|---|
| | Top | Bottom |
| 1 | 45 | 59 |
| 2 | 46 | 58 |
| 3 | 55 | 55 |
| 4 | 46 | 53 |
| 5 | 50 | 55 |
| 6 | 44 | 52 |
| 7 | 43 | 53 |
| 8 | 48 | 52 |
| 9 | 46 | 48 |

Accordingly, it should be appreciated that the present invention accomplishes its intended objects in providing a relative humidity sensor and controller which is reliable for a specific set of temperature and relative humidity conditions and which is relatively simple in design and inexpensive to manufacture. While the selected fluid 40 provides only one operating temperature, the overall simplicity and economy of design overrides any drawbacks inherent in this limitation since the control of only one specific relative humidity is desired. Further, it should be obvious that it is within the skill of the art to select a liquid or azeotropic liquid mixture for providing the desired saturation temperature.

Having thus described the invention in detail, what is claimed as new is:

1. In a method of operating gas sterilizing apparatus, including heating a sterilizing chamber to, and maintaining the chamber at, a selected temperature, introducing water to humidify the chamber and introducing a sterilizing gas into the chamber, the improvement comprising the steps of maintaining the relative humidity within the chamber at substantially a selected relative humidity level by:
  (a) introducing into the chamber an amount of water in excess of an amount sufficient to provide said selected relative humidity;
  (b) condensing the excess water vapor within the sterilizing chamber by passing a liquid in indirect heat exchange relationship with a portion of the interior of the sterilizing chamber, said liquid having a boiling point substantially equal to the dew point of moisture within the chamber corresponding to said selected humidity level; and
  (c) maintaining the condensed water vapor within the sterilizing chamber and in direct contact with the sterilizing gas so that at least a portion of said condensed water vapor is reevaporated to provide a steady state environment within the sterilizing chamber at substantially said selected relative humidity level.

2. A method for maintaining the atmosphere within a gas sterilizing vessel at a substantially constant, preselected relative humidity comprising the steps of:
  (a) heating said vessel to a preselect sterilizing temperature;
  (b) introducing into said vessel an amount of water vapor in excess of the amount necessary to provide said preselected relative humidity;
  (c) maintaining a portion of the interior of said vessel at a selected temperature below said sterilizing temperature and substantially equal to the saturation temperature of the atmosphere in said vessel corresponding to said preselected relative humidity to condense the excess water vapor adjacent said vessel portion;
  (d) maintaining said condensed excess water vapor within said vessel; and
  (e) heating said condensed water vapor within said vessel to reevaporate the same, the condensing and reevaporating of excess water vapor in said vessel being continuous so as to provide a steady state condition at substantially said selected relative humidity.

3. A method as set forth in claim 2, wherein said portion of the interior of said vessel is maintained at said saturation temperature by passing a liquid indirect heat exchange relationship with said vessel portion, said liquid having a boiling point corresponding to said saturation temperature whereby said liquid at said vessel portion is constantly boiling to maintain said vessel portion at said saturation temperature.

4. A method as set forth in claim 3 comprising the steps of:
  (a) removing the vapor produced by said boiling liquid from said vessel portion;
  (b) condensing said vapor outside of said vessel; and
  (c) returning the condensate so produced to said vessel portion.

References Cited
UNITED STATES PATENTS

| | | | |
|---|---|---|---|
| 1,965,078 | 7/1934 | Hewitt et al. | 165—3 X |
| 2,149,990 | 3/1939 | Cook | 165—3 X |
| 2,192,348 | 3/1940 | James | 165—3 X |
| 2,260,710 | 10/1941 | Gschwind | 165—105 X |
| 2,548,325 | 4/1951 | Smith | 165—105 X |
| 3,068,064 | 12/1962 | McDonald | 21—DIG. 4 |
| 3,171,473 | 3/1965 | Lawler | 165—21 |
| 3,487,997 | 1/1970 | Davis et al. | 165—3 X |

FOREIGN PATENTS 249,566  12/1969  Russia _____ 21—DIG. 4

BARRY S. RICHMAN, Primary Examiner

U.S. Cl. X.R.

21—DIG. 4; 165—3, 21, 30, 61, 105